United States Patent
Shimizu et al.

(10) Patent No.: US 9,527,692 B2
(45) Date of Patent: Dec. 27, 2016

(54) IMAGE FORMING APPARATUS

(71) Applicants: Keiichi Shimizu, Kanagawa (JP); Kohta Takenaka, Kanagawa (JP)

(72) Inventors: Keiichi Shimizu, Kanagawa (JP); Kohta Takenaka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/704,339

(22) Filed: May 5, 2015

(65) Prior Publication Data

US 2015/0329305 A1  Nov. 19, 2015

(30) Foreign Application Priority Data

May 15, 2014 (JP) ................. 2014-101140

(51) Int. Cl.
| | |
|---|---|
| *B65H 29/14* | (2006.01) |
| *B65H 29/12* | (2006.01) |
| *B41J 3/46* | (2006.01) |
| *B65H 31/02* | (2006.01) |
| *G03G 15/00* | (2006.01) |
| *G03G 21/16* | (2006.01) |

(52) U.S. Cl.
CPC ............ *B65H 29/14* (2013.01); *B41J 3/46* (2013.01); *B65H 29/125* (2013.01); *B65H 31/02* (2013.01); *G03G 15/5016* (2013.01); *G03G 15/6552* (2013.01); *B65H 2301/4212* (2013.01); *B65H 2402/31* (2013.01); *B65H 2551/20* (2013.01); *B65H 2801/06* (2013.01); *G03G 21/1604* (2013.01); *G03G 21/1647* (2013.01)

(58) Field of Classification Search
CPC ....... B65H 29/12; B65H 29/125; B65H 29/14; B65H 2551/10; B65H 2551/12; B65H 2551/20; G06K 15/16; G03G 15/5016; G03G 15/6552; G03G 21/1647; G03G 21/1604; B41J 3/46
See application file for complete search history.

(56) References Cited

U.S. PATENT DOCUMENTS

| | | | | |
|---|---|---|---|---|
| 2002/0125632 | A1* | 9/2002 | Aoki | B65H 7/02 271/279 |
| 2005/0175371 | A1* | 8/2005 | Kunugi | G03G 15/5016 399/107 |
| 2007/0002290 | A1* | 1/2007 | Muraki | B41J 3/46 353/119 |
| 2007/0126170 | A1* | 6/2007 | Silverbrook | B65H 3/06 271/117 |
| 2012/0305726 | A1* | 12/2012 | Hashimoto | F16M 11/10 248/292.12 |

FOREIGN PATENT DOCUMENTS

JP   2010-109458   5/2010

* cited by examiner

*Primary Examiner* — David H Bollinger
(74) *Attorney, Agent, or Firm* — Harness, Dickey & Pierce, P.L.C.

(57) ABSTRACT

An image forming apparatus includes an apparatus body, a sheet stack face disposed in an upper portion of the apparatus body, a pair of sheet ejection rollers to eject a sheet onto the sheet stack face in an ejection direction toward a front side of the apparatus body, a hinge secured to the apparatus body, and a control panel disposed higher than the apparatus body and supported by the hinge rotatably around the hinge. The control panel is rotatable within a movable range positioned higher than a trajectory drawn by the sheet ejected onto the sheet stack face.

13 Claims, 5 Drawing Sheets

IMAGE FORMING APPARATUS

CROSS-REFERENCE TO RELATED APPLICATIONS

This patent application is based on and claims priority pursuant to 35 U.S.C. §119(a) to Japanese Patent Application No. 2014-101140, filed on May 15, 2014, in the Japan Patent Office, the entire disclosure of which is hereby incorporated by reference herein.

BACKGROUND

Technical Field

Embodiments of the present invention generally relate to an image forming apparatus, such as a copier, a printer, a facsimile machine, or a multifunction peripheral (MFP or multifunction machine) including at least two of copying, printing, facsimile transmission, plotting, and scanning capabilities.

Description of the Related Art

Image forming apparatuses typically include a control panel, and the control panel is disposed to be easily accessed from above or a front side of a body of the image forming apparatus (hereinafter "apparatus body") by users for usability and operability. To improve operability of the control panel, there are mechanisms to make the angle of the control panel variable.

Similarly, sheets of recording media on which images are formed, consumables, and replaceable components are disposed to be easily accessed from above or the front side of the apparatus body by users. In this specification, consumables include replaceable components and units. To pursue ease of operation, various ingenuities are tried.

The size of the control panel is currently increasing because a display portion thereof increases in size due to increases in information displayed, adoption of a touch panel, or the like. On the contrary, compact image forming apparatuses are preferred.

SUMMARY

An embodiment of the present invention provides an image forming apparatus that includes a sheet stack face disposed in an upper portion of an apparatus body, a pair of sheet ejection rollers to eject a sheet onto the sheet stack face in an ejection direction toward a front side of the apparatus body, a hinge secured to the apparatus body, and a control panel disposed higher than the apparatus body and supported by the hinge rotatably around the hinge. The control panel is rotatable within a movable range positioned higher than a trajectory drawn by the sheet ejected onto the sheet stack face.

In another embodiment, an image forming apparatus includes the above-described sheet stack face, the pair of sheet ejection roller, the hinge, and the control panel disposed higher than the apparatus body and supported by the hinge rotatably around the hinge. The movable range of the control panel is positioned anterior to a back end of the apparatus body.

In yet another embodiment, an image forming apparatus includes the above-described sheet stack face, the pair of sheet ejection roller, the hinge, and the control panel disposed higher than the apparatus body and supported by the hinge rotatably around the hinge. An outer end of the control panel is positioned inside an outer end of the apparatus body in a lateral direction perpendicular the ejection direction in which the sheet is ejected.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
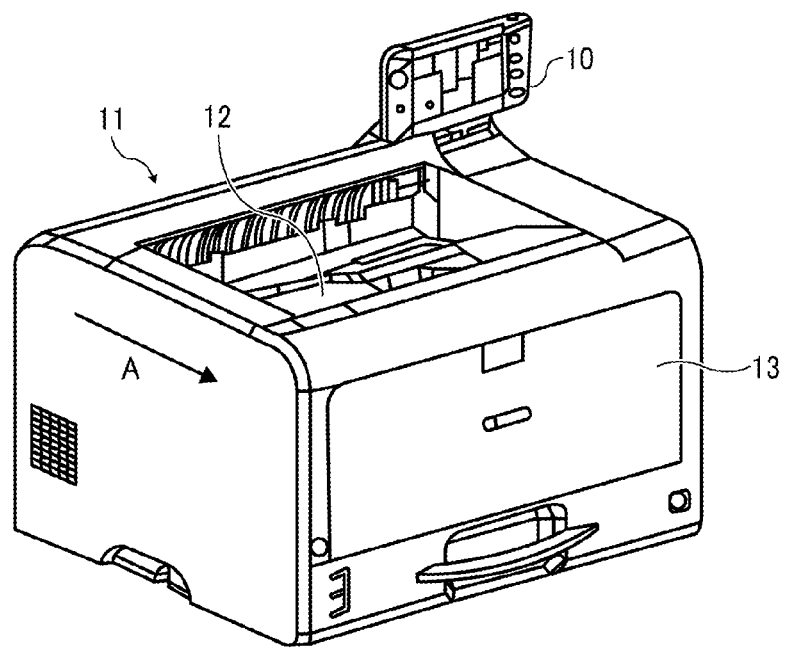
FIGS. 1A, 1B, 1C, and 1D are schematic views of an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIGS. 1A through 1D, an image forming apparatus according to an embodiment of the present invention is described.

FIG. 1A is a schematic perspective view of the image forming apparatus according to the present embodiment.

The image forming apparatus illustrated in FIG. 1A includes a control panel unit 10 and a front cover 13, both provided to an apparatus body 11. I The control panel unit 10 is capable of tilting to a front side and a back side of the apparatus body 11. The front cover 13 is openable and closable for replacement of consumables. It is to be noted that, in this specification, the term "consumables" include replaceable components and units.

The mage forming apparatus according to the present embodiment further includes a sheet stack face 12 disposed in an upper portion of the apparatus body 11 and a pair of sheet ejection rollers 103. For example, the sheet ejection rollers 103 are disposed in an upper portion on a back side in the apparatus body 11. The sheet ejection rollers 103 eject sheets of recording media on which images are formed from the back side toward the front side (proximal side in FIG. 1A) of the apparatus, which is the direction indicated by arrow A in FIG. 1A (hereinafter "sheet ejection direction"). The sheets are stacked on the sheet stack face 12 (i.e., an output tray) positioned in the upper portion of the apparatus body 11. In the configuration illustrated in FIG. 1A, the sheet stack face 12 is exposed from above and recessed from an upper face 11A (in FIG. 5 of the apparatus body 11.

Figure 1B:
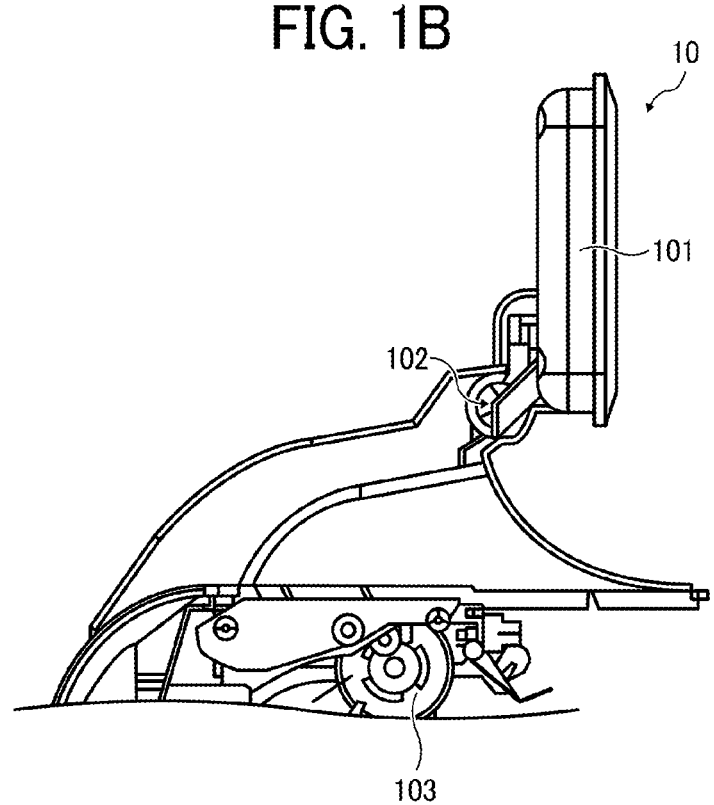
Figure 1C:
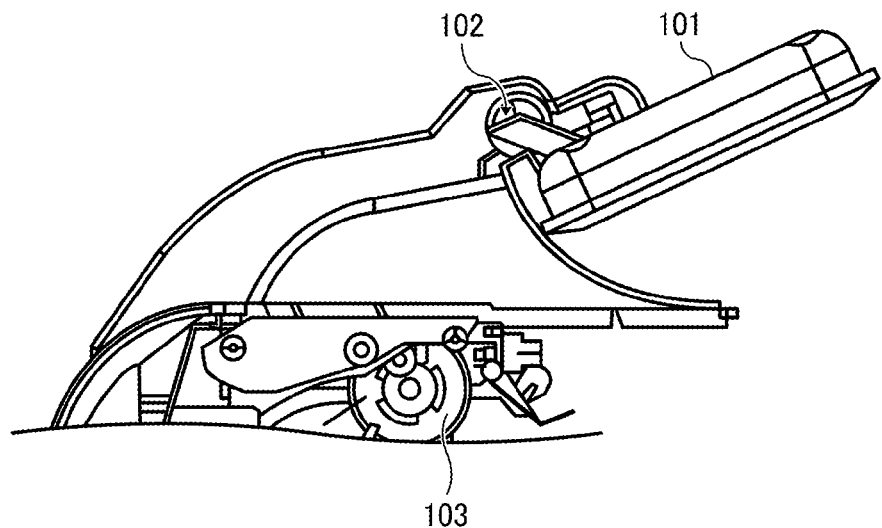
Figure 1D:
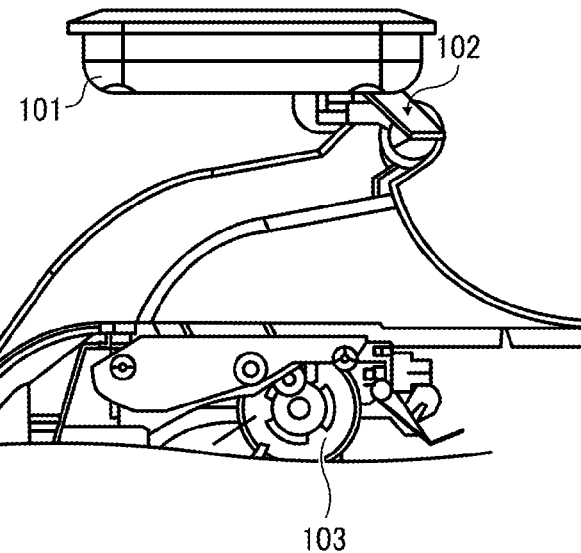

FIG. 1B is a side view of a display panel 101 of the control panel unit 10.

For example, the display panel 101, serving as a control panel, is electrically connected to a controller including a central processing unit (CPU) of the image forming apparatus. The display panel 101 includes display part and keys, and users can input instructions or data to the image forming apparatus by pressing the keys or touching the display part on the display panel 101.

The display panel 101 is supported by a hinge 102 secured to the apparatus body 11. The display panel 101 is rotatable (or pivotable) around the hinge 102 and movable between a posture inclined to the front side, illustrated in FIG. 1C, and a posture inclined to a back side, illustrated in FIG. 1D. The hinge 102 is positioned anterior to (downstream in the sheet ejection direction from) the sheet ejection rollers 103 disposed in the apparatus body 11.

Figure 2:
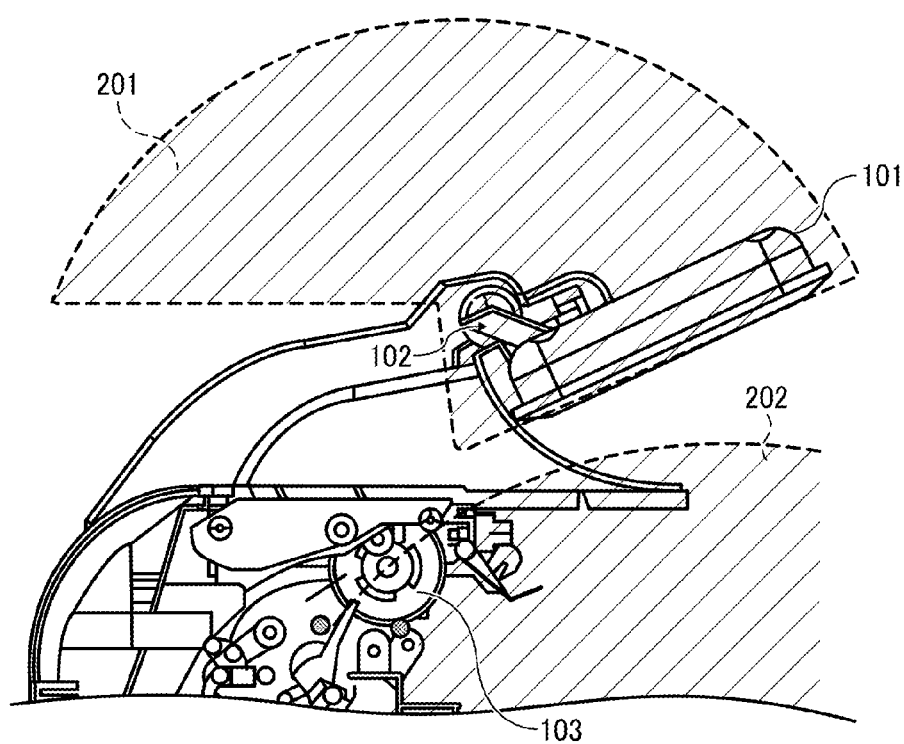
FIG. 2 illustrates a range in which a control panel unit according to an embodiment is movable.

FIG. 2 illustrates a range in which the display panel 101 is movable (hereinafter "movable range 201").

In FIG. 2, reference numeral 202 represents a range of trajectory drawn by sheets ejected from the apparatus body 11 onto the sheet stack face 12 by the sheet ejection rollers 103 (hereinafter "ejection trajectory range 202"). The display panel 101 is set at a given position within the movable range 201. The movable range 201 of the display panel 101 is constantly positioned higher than or above the ejection trajectory range 202 of the sheet ejected from the apparatus body 11.

Figure 3:
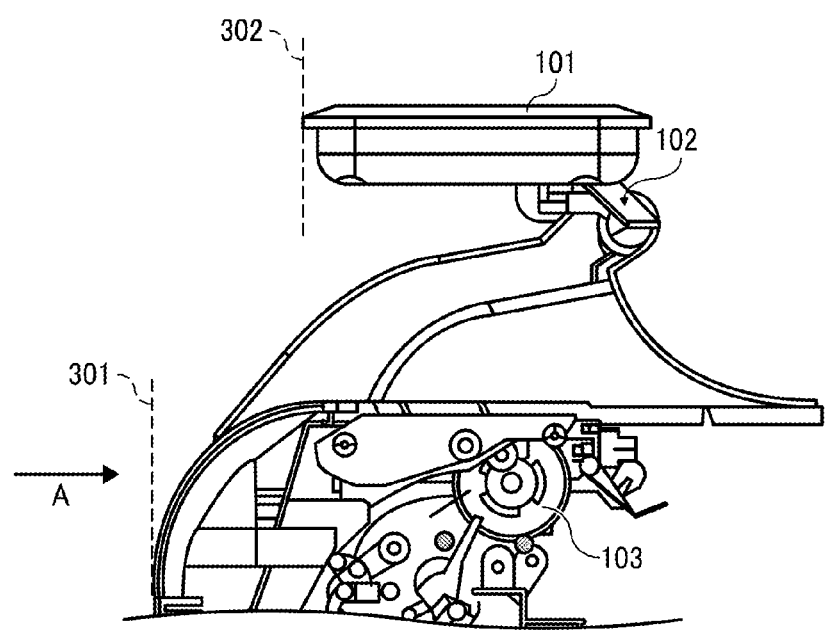
FIG. 3 illustrates a back end position of a body of the image forming apparatus illustrated in FIGS. 1A through 1D.

FIG. 3 illustrates a back end position 301 of the apparatus body 11.

In FIG. 3, reference numeral 302 represents a position of a back end of the display panel 101 (hereinafter "back end position 302"). Even when the display panel 101 is fully inclined backward as illustrated in FIG. 3, the back end position 302 thereof is anterior to (downstream in the sheet ejection direction indicated by arrow A from) the back end position 301 of the apparatus body 11.

Figure 4:
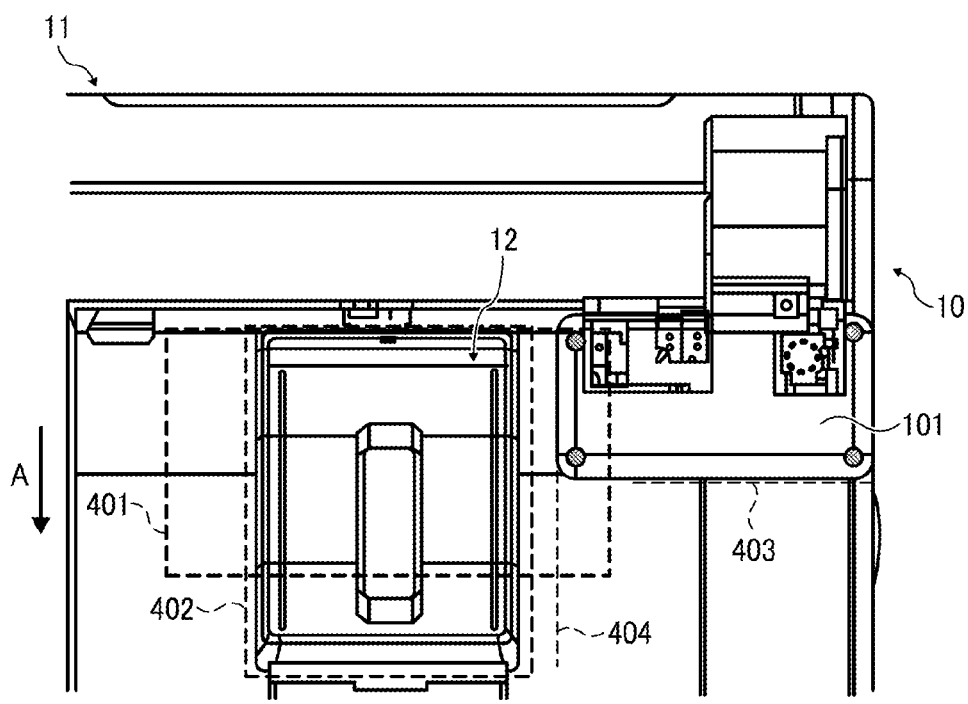
FIG. 4 illustrates a sheet stack face of the image forming apparatus illustrated in FIGS. 1A through 1D.

FIG. 4 is a top view of the apparatus body 11 and illustrates the sheet stack face 12.

In FIG. 4, reference numeral 401 represents an area on the sheet stack face 12, in which an A5 size sheet is placed sideways (placed with its shorter side parallel to the sheet conveyance direction (hereinafter "sideways A5 area 401"). Even when the display panel 101 is in the posture fully inclined forward as illustrated in FIG. 4, a front end position 403 of the display panel 101 is positioned posterior to (upstream in the sheet ejection direction indicated by arrow A from) a front end of the sideways A5 area 401 on the sheet stack face 12. In other words, the movable range 201 (in FIG. 2) is posterior to (upstream in the sheet ejection direction indicated by arrow A from) the front end of the sideways A5 area 401.

Additionally, reference numeral 404 represents an end (hereinafter "inner end 404") of the display panel 101 on an inner side of the apparatus body 11 in a lateral direction in FIG. 4, which is perpendicular to the sheet ejection direction. The inner end 404 of the display panel 101 is outside an outer end of a postcard area 402 of the sheet stack face 12, in which a postcard is placed, on the sheet stack face 12.

The display panel 101 can partly overlap with the ejection trajectory range 202 on a horizontal projection plane. That is, the movable range 201 of the display panel 101 can partly overlap with (situated above) the ejection trajectory range 202 on the horizontal projection plane, as illustrated in FIG. 4.

Figure 5:
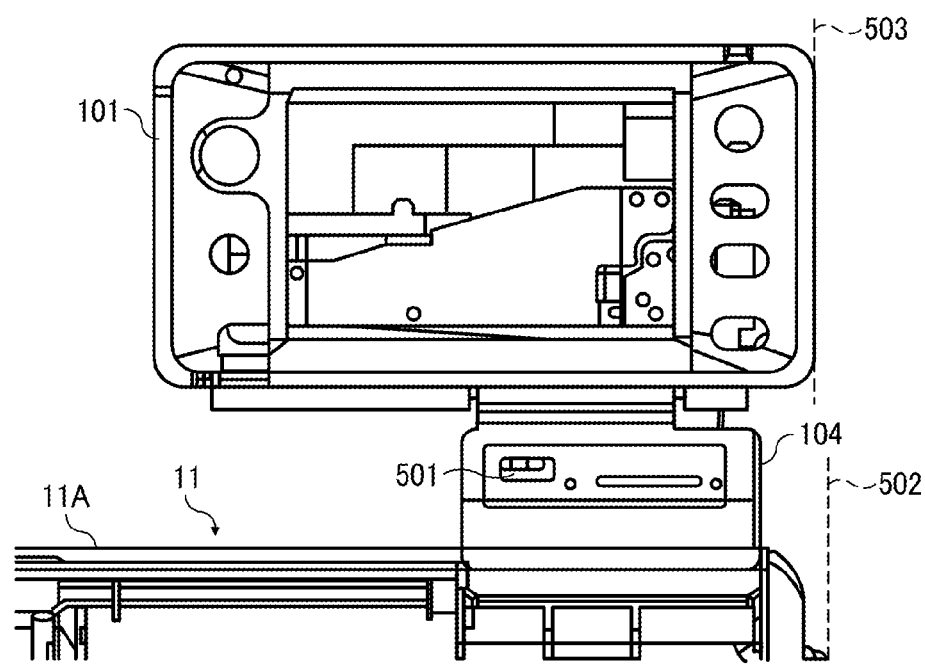
FIG. 5 is a front view of a control panel unit according to an embodiment.

FIG. 5 is a front view of the display panel 101.

An outer end position 503, where an outer end of the display panel 101 is situated, is inside an outer end position 502 of the apparatus body 11 in the lateral direction as illustrated in FIG. 5. The image forming apparatus illustrated in FIG. 5 further includes an insertion slot 501, serving as a data reader, for insertion of a memory device. The insertion slot 501 is positioned between the display panel 101 and an upper face 11A of the apparatus body 11. For example, the insertion slot 501 is disposed in a support 104 projecting from the upper face 11A of the apparatus body 11 to support the display panel 101.

Figure 6:
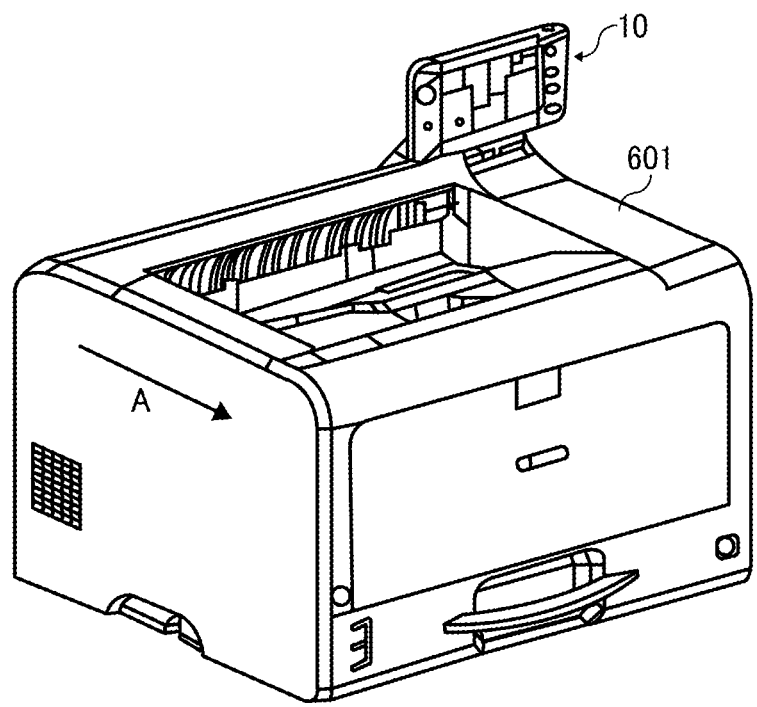
FIG. 6 is a perspective view of an image forming apparatus that includes a data reader, according to an embodiment.

FIG. 6 is a perspective view of the apparatus body 11 and illustrates a position of a card reader 601 as another data reader.

In FIG. 6, the image forming apparatus includes the card reader 601 instead of the insertion slot 501 illustrated in FIG. 5. The card reader 601 is disposed in a space extending in front of the control panel unit 10.

Thus, according to the embodiments described above, in the arrangement in which the control panel unit 10 is disposed higher than the sheet stack face 12 on the upper side of the apparatus body 11 and the sheet is ejected to the front side of the apparatus body 11, the movable range 201 of the display panel 101 of the control panel unit 10 is positioned higher than the ejection trajectory range 202 of sheets ejected from the apparatus body 11. With this configuration, transportation of the image forming apparatus as well as access to sheets and consumables are not impaired while securing the operability of the control panel unit 10.

Specifically, in the embodiment described above, the movable range 201 within which the display panel 101 is movable is positioned higher than or above the trajectory drawn by sheets ejected from the apparatus body 11 (i.e., the ejection trajectory range 202).

This arrangement is advantageous in that a relatively long distance is kept between the display panel 101 and the sheet stack face 12 in a vertical direction.

Accordingly, rotation of the display panel 101 does not hinder transportation of the image forming apparatus nor hinders replacement of consumables and replaceable components such as cartridges.

Additionally, according to an aspect of this specification, since the hinge 102 is positioned anterior to the sheet ejection rollers 103 of the apparatus body 11, the control panel unit 10 is relatively close to users. Thus, operability is enhanced.

According to another aspect of this specification, since the movable range 201 of the display panel 101 is anterior to the back end position 301 of the apparatus body 11, rotation of the display panel 101 is not an obstacle in deciding where to install the image forming apparatus. Similarly, since the outer end of the display panel 101 is positioned inside the outer end position 502 of the apparatus body 11 in the lateral direction, rotation of the display panel 101 is not an obstacle in deciding where to install the image forming apparatus.

According to another aspect of this specification, the movable range 201 of the display panel 101 is posterior to the front end of an A5 size sheet placed sideways on the sheet stack face 12. This arrangement is advantageous in that rotation of the display panel 101 does not hinder access to the sheets on the sheet stack face 12.

Additionally, the arrangement in which the inner end 404 of the control panel unit 10 (the display panel 101 in particular) is outside the outer end of the postcard size area on the sheet stack face 12 is advantageous in that rotation of the display panel 101 does not hinder access to the sheets on the sheet stack face 12.

According to another aspect of this specification, a data reader, such as the card reader 601 or the insertion slot 501 for insertion of a memory device, is disposed between the control panel unit 10 and the apparatus body 11. In this configuration, the apparatus can be kept compact by disposing necessary functions in a free space. Similar effects are available when the data reader is disposed in the range extending in front of the control panel unit 10.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image forming apparatus comprising:
an apparatus body;
a sheet stack face located in an upper portion of the apparatus body;
a pair of sheet ejection rollers configured to eject a sheet onto the sheet stack face in an ejection direction toward a front side of the apparatus body;
a hinge secured to the apparatus body;
a control panel located higher than the apparatus body and supported by the hinge rotatably around the hinge; and
a data reader located in a space extending in front of the control panel,
wherein the control panel is configured to rotate within a movable range positioned higher than a trajectory drawn by the sheet ejected from the pair of sheet ejection rollers onto the sheet stack face, and
wherein an axis of the hinge and axis of the pair of sheet ejection rollers extend in a same direction with respect to each other.

2. An image forming apparatus comprising:
an apparatus body;
a sheet stack face located in an upper portion of the apparatus body;
a pair of sheet ejection rollers configured to eject a sheet onto the sheet stack face in an ejection direction toward a front side of the apparatus body;
a hinge secured to the apparatus body;
a control panel located higher than the apparatus body and supported by the hinge rotatably around the hinge; and
a data reader located in a space extending in front of the control panel,
wherein the control panel is configured to rotate within a movable range positioned higher than a trajectory drawn by the sheet ejected from the pair of sheet ejection rollers onto the sheet stack face.

3. The image forming apparatus according to claim 2, wherein the movable range of the control panel is posterior to a front end of an area in which an A5 size sheet is placed sideways on the sheet stack face.

4. An image forming apparatus comprising:
an apparatus body;
a sheet stack face located in an upper portion of the apparatus body;
a pair of sheet ejection rollers configured to eject a sheet onto the sheet stack face in an ejection direction toward a front side of the apparatus body;
a hinge secured to the apparatus body;
a control panel located higher than the apparatus body and supported by the hinge rotatably around the hinge; and
a data reader located in a space extending in front of the control panel,
wherein the control panel is configured to rotate within a movable range positioned anterior to a back end of the apparatus body, and
wherein an axis of the hinge and axis of the pair of sheet ejection rollers extend in a same direction with respect to each other.

5. An image forming apparatus comprising:
an apparatus body;
a sheet stack face located in an upper portion of the apparatus body;
a pair of sheet ejection rollers configured to eject a sheet onto the sheet stack face in an ejection direction toward a front side of the apparatus body;
a hinge secured to the apparatus body;
a control panel located higher than the apparatus body and supported by the hinge rotatably around the hinge; and
a data reader located in a space extending in front of the control panel,
wherein an outer end of the control panel is positioned inside an outer end of the apparatus body in a lateral direction perpendicular the ejection direction in which the sheet is ejected, and
wherein an axis of the hinge and axis of the pair of sheet ejection rollers extend in a same direction with respect to each other.

6. The image forming apparatus according to claim 2, wherein the hinge is positioned anterior to the pair of sheet ejection rollers.

7. The image forming apparatus according to claim 2, wherein an inner end of the control panel is positioned outside a postcard area of the sheet stack face in a lateral direction perpendicular the ejection direction in which the sheet is ejected.

8. The image forming apparatus according to claim 2, further comprising an insertion slot for insertion of a memory device, the insertion slot positioned between the control panel and an upper face of the apparatus body.

9. The image forming apparatus according to claim 2, wherein the control panel partly overlaps with an ejection trajectory range on a horizontal projection plane.

10. The image forming apparatus according to claim 2, wherein the control panel is rotatable around the hinge and movable between a posture inclined to the front side of the apparatus body and the a posture inclined to the back side of the apparatus body.

11. The image forming apparatus according to claim 2, wherein the movable range of the control panel is constantly positioned higher than or above the ejection trajectory range of the sheet ejected from the apparatus body.

12. The image forming apparatus according to claim 2, further comprising a card reader.

13. The image forming apparatus according to claim 12, wherein the card reader is located in a space extending in front of the control panel.

* * * * *